United States Patent [19]

Macpherson et al.

[11] Patent Number: 5,718,754
[45] Date of Patent: Feb. 17, 1998

[54] PIGMENT COMPOSITIONS

[75] Inventors: Ian Alexander Macpherson, Paisley; Iain Frank Fraser, Kilbirnie; Peter Cyril White; William Ewen Smith, both of Glasgow, all of Scotland; Calum Hugh Munro, Pittsburgh, Pa.

[73] Assignee: Ciba Specialty Chemicals Corporation, Tarrytown, N.Y.

[21] Appl. No.: 788,148

[22] Filed: Jan. 24, 1997

[30] Foreign Application Priority Data

Jan. 26, 1996 [GB] United Kingdom ............ 9601604

[51] Int. Cl.$^6$ .................................. C09B 67/50
[52] U.S. Cl. ............ 106/413; 106/31.75; 106/31.76; 106/31.77; 106/31.78; 106/31.79; 106/31.8; 106/31.81; 106/410; 106/411; 106/493; 106/494; 106/495; 106/496; 106/497; 106/498; 162/134; 101/491; 264/78; 264/134; 283/91; 427/197; 428/195; 902/7; 902/28
[58] Field of Search ................. 106/410, 411, 106/413, 493, 494, 495, 496, 497, 498, 31.75, 31.76, 31.77, 31.78, 31.79, 31.8, 31.81; 162/134; 283/91; 101/491; 427/197; 428/195; 264/78, 134; 902/7, 28

[56] References Cited

U.S. PATENT DOCUMENTS

| | | | |
|---|---|---|---|
| 4,720,304 | 1/1988 | Ruff et al. | 106/494 |
| 5,324,567 | 6/1994 | Bratchley et al. | 428/195 |

FOREIGN PATENT DOCUMENTS

| | | |
|---|---|---|
| 0161665 | 11/1985 | European Pat. Off. . |
| 0193022 | 9/1986 | European Pat. Off. . |
| 0208211 | 1/1987 | European Pat. Off. . |
| 0278913 | 8/1988 | European Pat. Off. . |
| 2071683 | 9/1981 | United Kingdom . |
| 2275479 | 8/1994 | United Kingdom . |

OTHER PUBLICATIONS

Derw. Abst. No. 88–229726[33] of EP 278,913 (Aug. 1988).

Derw. Abst No. 86–233124[36] of EP 193022 (Jun. 1988).

*Primary Examiner*—Mark L. Bell
*Assistant Examiner*—Scott L. Hertzog
*Attorney, Agent, or Firm*—Kevin T. Mansfield; David R. Crichton

[57] ABSTRACT

The invention provides a pigment composition comprising a pigment having adsorbed on its surface, or as a physical mixture, up to 10% by weight, based on the total weight of pigment composition of a coding compound which is a compound containing an azo, azomethine or polycyclic chromophore and which has an absorption spectrum and a Raman spectrum different from that of the pigment. The compositions are suitable for use in printing inks for security applications.

15 Claims, No Drawings

PIGMENT COMPOSITIONS

The present invention relates to pigment compositions and their use in inks, especially for use on banknotes and other security items.

Security-printed items such as banknotes, cheques, passports, licences, tickets and branded items need to be produced in a manner which allows the genuine article to be authenticated. Various measures have been adopted ranging from easily visible features which are only verified by a machine.

The use of Raman and Resonance Raman scattering spectroscopy (RRS) has been described for use with inks containing a polydiacetylene in U.S. Pat. No. 5,324,567. Exposure of a printed item carrying the ink to a laser light produces Raman scattering which can be detected by a suitable machine.

Polydiacetylenes are not light fast and therefore the sensitivity of the detection method reduces with time.

Pigments used in printing inks for security items are usually light fast. We have now developed a method of modifying the pigment itself so that it can be readily detected using RRS. This modification allows the use of more than one excitation wavelength for detection.

Accordingly, the present invention provides a pigment composition comprising a pigment having adsorbed on its surface, or as a physical mixture, up to 10% by weight, based on the total weight of pigment composition of a compound containing an azo, azomethine or polycyclic chromophore and which has an absorption spectrum and a Raman spectrum different from that of the pigment or of other pigments normally used in printing inks of this type.

The compound which is adsorbed on the pigment surface or is added as a physical mixture is hereafter known as the coding compound.

The pigment may be any pigment commonly used in printing inks, such as arylamide, diarylide, azo metal salt, or phthalocyanine pigment.

The coding compound adsorbed on the surface of the pigment is preferably a compound which is not normally used in printing inks, such as a copper phthalocyanine derivative.

The coding compound which is physically mixed with the pigment is preferably an isoindolinone, diketopyrrolopyrrole, Schiff base metal complex, ferricyanide or a compound of formula (1).

Formula (1)

wherein MPc is a phthalocyanine nucleus

M is a metal atom, a chloro-metal group, an oxy-metal group or hydrogen

X is halogen $R^1$ is an organic radical $R^2$ is H or an optionally substituted alkyl radical a has an average value from 15 to 1 b has an average value from 1 to 15 a+b is from 4 to 16.

The coding compound should preferably have an absorption frequency maximum at or near an absorption minimum of the pigment or even be outside the spectral range of the pigment. This separation gives the maximum sensitivity for detection by RRS.

If the wavelength of the illuminating light is matched with the absorption maximum of the coding compound then the Raman spectrum recovered is significantly enhanced allowing much greater sensitivities to be obtained. This in turn means that much lower amounts of coding compound are required for identification or alternatively that lower radiation levels can be used for the incident light. Furthermore, the colour of the coding compound can be more effectively masked so that it is effectively invisible.

The matching of the wavelengths of the illuminating radiation and the absorption maximum of the coding compound can be achieved in two ways. Firstly the laser wavelength may be selected to any devised wavelength and can therefore be used to detect the Raman spectrum of the coding compound in the presence of many different substances. Alternatively the coding compound can be selected so that it possesses an absorption maximum at or close to the available laser frequency. This latter option allows the lowest cost system without loss of efficiency since tunable lasers are expensive.

The laser frequency can be visible, ultraviolet or infra-red when matched with suitably absorbing coding compounds.

Thus by selecting a coding compound with an absorption maximum at or near 518 nanometers and incorporating this material in an ink which is then printed on a substrate a Raman spectrometer using laser illumination of 518 nanometers can easily detect the presence or absence of the coding compound.

For example the pigment may have an absorption maximum at 673 nm and the coding compound an absorption maximum at 518 mm.

By using laser illumination at a frequency of 518 mm, the coding compound can be readily detected. If two frequencies are used e.g. 673 and 518 nm the ratio of the pigment and coding compound can be determined. This enables authentication to be more certain.

The amount of the coding compound should be not greater than 5% by weight in order to avoid changing the colour of the pigment. Lower amounts can be used provided that they are not too low and escape detection by RRS.

The use of RRS provides a significant advantage over fluorescence spectroscopy in that the use of pigments and pigmentary materials as the coding compound is permitted. The resolution obtained from coding compounds by RRS is very much superior to fluorescence resolution. This allows the use of more than one coding compound to be incorporated while still providing a usable fingerprint spectrum for detection.

A suitable combination of pigment and coding compared to give absorption maxima at 673 nm and 518 mm is a calcium 4B metal salt pigment (Pigment Red 57.1) having copper phthalocyanine sulphonic acid as the coding compound adsorbed on its surface.

In order to adsorb the desired coding compound on the pigment it is only necessary to stir the compounds together in water for the above example. Other methods include use of suitable solvents or dry mixing or use of dispersion equipment if the coding compound is to be physically mixed with the pigment.

After the pigment has been treated with the coding compound the composition may be treated by the usual treatments such as resination by a natural or synthetic resin.

The pigment composition of the invention may be a constituent of a printing ink which may be designed for use by lithography, letterpress printing, intaglio printing or screen printing. The ink may contain the pigment composition in an amount of from 0.1 to 25%, preferably 1 to 20% by weight. The ink may contain other components such as driers and other pigments.

The present invention also comprises as ink containing an ink vehicle and a pigment composition of the invention.

Inks of the invention are primarily intended to be printed on the security documents and other items which need to be authenticated. In this context, the substrates used for printing are generally paper, including rag paper, preferably currency-grade paper, plastics-coated or laminated paper, and plastics such as, for example, bankcard-grade PVC, or plastic paper, e.g. non woven plastic paper. Articles bearing security printing include banknotes, banknote thread, currency, travellers' cheques, bonds, certificates, stamps, lottery tickets, ownership documents, passports, identity cards, credit cards, charge cards, access cards, smart cards, brand authentication labels and tags, and tamperproof labels.

Security documents normally have different types of printing present selected from intaglio, offset lithographic, letterpress printing and occasionally gravure. An ink of the invention will normally be used in addition to/beside security-printed areas in a variety of colours. Rainbow-printing techniques are often used in security documents.

The pigment composition of the invention may also be included in electro-photographic toners, matrix or daisy-wheel printer inks, and non-impact printing methods.

The pigment composition of the invention may also be included, not necessarily as inks, in paper including rag papers and plastic papers, banknote threads, plastic cards and other security documents or items which need to be authenticated, if necessary blended with a polymer and bonded other than in an ink. The pigment composition of the invention may be deposited in a single area or a series of areas, if necessary or desired in a cooled pattern.

The pigment composition may be incorporated into items which need to be authenticated e.g. by incorporating it in a label such as a holographic label bearing printing in an ink containing a Raman-active compound, or in a hot-stamping foil construction. In general, the pigment composition may be on or near the surface of the item to be authenticated.

The invention is illustrated by the following Examples.

PIGMENT MIXTURES

The following examples of mixed pigments are prepared, each containing a major pigment component and a minor pigment component, the latter being visibly obscured by the major component but still being visible by Raman detection.

EXAMPLE 1

18 gms of a Copper Phthalocyanine pigment, IRGALITE Blue GLG, are powder blended with 2 gms of a pigment Red 57.1, IRGALITE Rubine L4BD, until an intimate powder mix was obtained.

EXAMPLE 2

18 gms of a Pigment Yellow 13, IRGALITE Yellow LBS are powder blended with 2 gms of a Malachite Green pigment, until an intimate powder mix was obtained.

EXAMPLE 3

18 gms of a Copper Phthalocyanine pigment, IRGALITE Blue GLG, are powder blended with 2 gms of IRGAZIN Orange 5R, until an intimate powder mix was obtained.

EXAMPLE 4

18 gms of a Copper Phthalocyanine pigment, IRGALITE Blue GLG, are powder blended with 2 gms of IRGAZIN Yellow 5GT, until an intimate powder mix was obtained.

EXAMPLE 5

30 g of a filtercake of Pigment Red 57.1, containing 10 gms dry weight of the pigment, are re-slurried in water and a solution of 0.1 gms of Copper Phthalocyanine monosulphonic acid in water is added. The slurry is heated to 95° C. for 3 hours and then cooled, filtered, washed and dried. The solid pigment is recovered and then finely powdered.

EXAMPLE 6

30 gms of a filtercake of Pigment Red 57.1, containing 10 gms dry weight of the pigment, are re-slurried in water and a solution of 0.01 gms of Copper Phthalocyanine monosulphonic acid in water is added. The slurry is heated to 95° C. for 3 hours and then cooled, filtered, washed and dried. The solid pigment is recovered and then finely powdered.

EXAMPLE 7

30 gms of a filtercake of Pigment Red 57.1, containing 10 gms dry weight of the pigment, are re-slurried in water and a solution of 0.5 gms of Copper Phthalocyanine monosulphonic acid in water is added. The slurry is heated to 95° C. for 3 hours and then cooled, filtered, washed and dried. The solid pigment is recovered and then finely powdered.

INK FORMULATION AND COMPOSITION

Inks containing the pigment compositions described in the above Examples are prepared as follows:

20 gms of the pigment compositions are hand mixed with 80 gms of an ink varnish containing 32 parts long oil alkyd 50 parts modified phenolic resin 18 parts ink oil The ink is given 2 passes through a triple roll mill and reduced to 15% pigmentation level by addition of ink varnish.

PRINTING STEP

The inks prepared as described above from Example 1 to 7 are printed using a Prufbau printed onto a selection of paper substances. The print weight is adjusted to approximately 1.25 gms of ink per square meter of printed surface.

DETECTION

Detection of the minor component of the pigment mixture on the printed paper is by use of a Renishaw 2000 (Example 1–5, 7 and 8) or an Anaspec modified Cary 81 Spectrometer (Example 6). Excitation is provided using Argon Ion Lasers. The Resinshaw uses 20 mw of 514.5 nm radiation and the Cary uses 20–50 nw of tunable radiation provided with the Argon Ion Laser as a pump and a Spectra Physics 375 Dye Laser with DCM dye to provide tunable radiation in the red region.

EXAMPLE 1

The minor component of the pigment mixture (Pigment Red 57.1) shows clearly in the recovered detection spectrum with peaks at 1365 $cm^{-1}$, 1492 $cm^{-1}$, 1608 $cm^{-1}$ and is clearly distinguished from the Copper Phthalocyanine spectrum.

EXAMPLE 2

In the same way as in Example 1 the minor component, Malachite Green, can be clearly distinguished from the spectrum recovered from the printed paper.

EXAMPLE 3

In the same way as Example 1 the spectrum of IRGALITE Orange 5R can be clearly identified from the spectrum recovered from the printed paper with peaks at 1531 cm⁻¹, 1484 cm⁻¹, 1391 cm⁻¹ and 1234 cm⁻¹.

EXAMPLE 4

In the same way an Example 1 the Raman spectrum of IRGALITE Yellow 5GT can be clearly identified from the spectrum recovered from the printed paper.

EXAMPLE 5

The Copper Phthalocyanine Raman spectrum is clearly visible in the data recovered from the printed paper showing peaks of 748 cm⁻¹, 680 cm⁻¹, 592 cm⁻¹ and 488 cm⁻¹. In this case the tunable Dye Laser has been used with the excitation radiation frequencies close to the absorption resinance for Copper Phthalocyanine increasing the detection sensitivity.

EXAMPLE 6

In the same way as in Example 5 the Copper Phthalocyanine Raman spectrum is clearly visible in the data recovered from the printed paper showing peaks of 748 cm⁻¹, 680 cm⁻¹, 592 cm⁻¹ and 488 cm⁻¹.

EXAMPLE 7

In the same way as in Example 5 the Copper Phthalocyanine Raman spectrum is clearly visible in the data recovered from the printed paper showing peaks of 748 cm⁻¹, 680 cm⁻¹, 592 cm⁻¹ and 488 cm⁻¹.

We claim:

1. A pigment composition comprising a pigment having adsorbed on its surface, or as a physical mixture, an amount sufficient to be detected by Raman or Raman Resonance spectroscopy up to 10% by weight, based on the total weight of pigment composition of a coding compound which is a compound containing an azo, azomethine or polycyclic chromophore and which has an absorption spectrum and a Raman spectrum different from that of the pigment.

2. A composition as claimed in claim 1 in which the pigment is an arylamide, diarylide, azo metal salt, or phthalocyanine pigment.

3. A composition as claimed in claim 1 in which the coding compound is a compound which is not normally used in printing inks.

4. A composition as claimed in claim 1 in which the coding compound is an isoindolinone, diketopyrrolopyrrole, Schiff base metal complex, ferricyanide or a compound of formula (1),

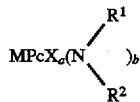

Formula (1)

wherein

MPc is a phthalocyanine nucleus

M is a metal atom, a chloro-metal group, an oxy-metal group or hydrogen

X is halogen $R^1$ is an organic radical $R^2$ is H or an optionally substituted alkyl radical a has an average value from 15 to 1 b has an average value from 1 to 15 a+b is from 4 to 16.

5. A composition as claimed in claim 1 in which the coding compound has an absorption frequency maximum at or near an absorption minimum of the pigment or is outside the spectral range of the pigment.

6. A composition as claimed in claim 1 in which the amount of the coding compound is not greater than 5% by weight.

7. A composition as claimed in claim 1 in which the pigment has an absorption maximum at 673 nm and the coding compound an absorption maximum at 518 nm.

8. A composition as claimed in claim 7 in which the pigment is a calcium 4B metal salt pigment (Pigment Red 57.1) having copper phthalocyanine sulphonic acid as the coding compound adsorbed on its surface.

9. An ink containing an ink vehicle and a pigment composition as claimed in claim 1.

10. An ink as claimed in claim 9 which contains the pigment composition in an amount of from 0.1 to 25% by weight.

11. Security documents which are printed with an ink as claimed in claim 9.

12. Security documents as claimed in claim 11 which are banknotes, banknote thread, currency, travellers' cheques, bonds, certificates, stamps, lottery tickets, ownership documents, passports, identity cards, credit cards, charge cards, access cards, smart cards, brand authentication labels and tags, and tamperproof labels.

13. A method of detecting a pigment composition on a printed document as claimed in claim 11 which comprises exposing the printed item to a laser light and detecting the resulting Raman scattering.

14. An article which need to be authenticated, which contains the composition of claim 1 near the surface of said article.

15. The article of claim 14 which is a banknote, banknote thread, currency, travellers' cheque, bond, certificate, stamp, lottery ticket, ownership document, passport, identity card, credit card, charge card, access card, smart card, brand authentication label or tag, or tamperproof label.

* * * * *